(12) United States Patent
Del Fabro (10) Patent No.: US 12,403,523 B2
(45) Date of Patent: Sep. 2, 2025

(54) APPARATUS AND METHOD TO FEED BARS (71) Applicant: M.E.P. MACCHINE ELETTRONICHE PIEGATRICI S.P.A., Reana del Rojale (IT)

(72) Inventor: Giorgio Del Fabro, Udine (IT)

(73) Assignee: M.E.P. MACCHINE ELETTRONICHE PIEGATRICI S. P.A., Reana del Rojale (UD) (IT)

( * ) Notice: Subject to any disclaimer, the term of this patent is extended or adjusted under 35 U.S.C. 154(b) by 825 days.

(21) Appl. No.: 17/638,277

(22) PCT Filed: Aug. 20, 2020

(86) PCT No.: PCT/IT2020/050208
§ 371 (c)(1),
(2) Date: Feb. 25, 2022

(87) PCT Pub. No.: WO2021/038609
PCT Pub. Date: Mar. 4, 2021

(65) Prior Publication Data
US 2022/0324009 A1    Oct. 13, 2022

(30) Foreign Application Priority Data
Aug. 28, 2019  (IT) .......................... 102019000015168

(51) Int. Cl.
*B21D 43/00*    (2006.01)
*B65G 47/14*    (2006.01)

(52) U.S. Cl.
CPC ....... *B21D 43/006* (2013.01); *B65G 47/1407* (2013.01); *B65G 2201/0217* (2013.01)

(58) Field of Classification Search
CPC ............ B65G 47/1414; B65G 47/5113; B65G 47/1407; B65G 1/0442; B65G 2201/0217;
(Continued)

(56) References Cited
U.S. PATENT DOCUMENTS 3,144,139 A  *  8/1964  Chapellier ........... B21D 43/006
                                                    414/745.9
3,292,783 A  *  12/1966  Quist ..................... B65G 57/18
                                                    209/520
(Continued)

FOREIGN PATENT DOCUMENTS

DE           4142355 A1     6/1993
WO    WO-2014045242 A1 *   3/2014  ........... B21D 43/006
WO        2019123506 A1     6/2019

OTHER PUBLICATIONS

PCT International Search Report and Written Opinion for PCT Patent Application No. PCT/IT2020/050208 dated Dec. 8, 2020. 10 Pages.

*Primary Examiner* — Gregory W Adams
(74) *Attorney, Agent, or Firm* — MCANDREWS HELD & MALLOY, LTD (57) ABSTRACT

Apparatus to feed bars (B) to one or more user machines located downstream, said apparatus comprising a support plane (11), a bar feed zone (12) located in proximity to one bar supply end (13) of said support plane (11), wherein said support plane (11) comprises a unit (14) to move said bars (B) in a direction of movement (Z) from and toward said bar feed zone (12).

16 Claims, 10 Drawing Sheets

(58) Field of Classification Search
CPC ........ B21D 43/006; B65H 3/44; B65H 3/446; B27D 1/04; B07C 5/14
USPC .............. 209/933, 657, 517, 521; 414/789.6, 414/791.4, 745.1, 745.9, 745.7, 745.8, 414/746.1, 746.2, 746.7; 198/602; 271/9.01, 9.04
See application file for complete search history.

(56) References Cited

U.S. PATENT DOCUMENTS

| | | | | |
|---|---|---|---|---|
| 3,785,508 A * | 1/1974 | Hayden | ............... | B27D 1/04 414/789.6 |
| 3,880,296 A * | 4/1975 | Kaplan | ............... | B65G 57/183 414/790 |
| 4,205,751 A * | 6/1980 | Rysti | ............... | B07C 5/14 209/933 |
| 4,392,765 A * | 7/1983 | Barton | ............... | B65G 57/183 198/374 |
| 4,648,770 A * | 3/1987 | Berz | ............... | B65G 57/183 198/374 |
| 4,732,066 A * | 3/1988 | Del Fabro | ............... | B21F 23/005 198/456 |
| 4,969,313 A * | 11/1990 | Nonini | ............... | B65G 57/183 53/244 |
| 5,013,212 A * | 5/1991 | Castellani | ............... | B65G 57/183 414/791.4 |
| 5,357,778 A * | 10/1994 | Tsai | ............... | B21D 11/12 72/306 |
| 5,755,336 A * | 5/1998 | Rudy | ............... | B65H 9/163 198/367.1 |
| 6,123,202 A * | 9/2000 | Hellenbradt | ............... | B23Q 7/001 209/650 |
| 6,826,990 B2 * | 12/2004 | Olsen | ............... | B23D 36/0033 198/456 |
| 2010/0150685 A1 * | 6/2010 | Sawyer | ............... | E21B 19/15 414/800 |
| 2022/0324009 A1 * | 10/2022 | Del Fabro | ............... | B65G 47/1414 |

* cited by examiner fig. 1 fig. 6 fig. 7 fig. 12 fig. 13 fig. 14 fig. 15 fig. 19 fig. 20 fig. 21 fig. 22

APPARATUS AND METHOD TO FEED BARS

CROSS-REFERENCE TO RELATED APPLICATIONS

This application is a national stage application of International Application No. PCT/IT2020/050208, having an International filing date of Aug. 20, 2020, which claims priority to Italy Application No. 102019000015168, filed Aug. 28, 2019. The entire disclosures of the aforesaid applications are incorporated herein by reference.

FIELD OF THE INVENTION

The present invention concerns an apparatus and a method to feed bars, having different diameters and lengths, to one or more user machines located downstream of the apparatus or positioned at the terminal end of a line for transferring bars.

In particular, the apparatus can be used to receive suitably sized bars from a cutting plant, to store them homogeneously, for example according to diameter or other characteristic, and/or to make them selectively available to one or more user machines located downstream of the apparatus.

By the term bars we generally mean oblong-shaped products such as wire rod, reinforcement bars, round pieces, square pieces, or suchlike, having a circular, polygonal or flat cross-sectional shape.

BACKGROUND OF THE INVENTION

It is known to feed bars to user machines such as bending machines, stirrup-making machines, welding machines, cutting or counting plants or other.

Especially in the case of bending machines, stirrup-making machines and welding machines, it is known to pick up the bars, by means of robotic automated pick-up devices, or to receive them, through roller transport devices or suchlike, from suitable warehouses, positioned near the user machine or in a remote position to supply the bars to a feed station which feeds the machines as above.

The bars fed to the bending and welding machines may have already been cut to size, that is, previously cut and reduced in length, and stored in a homogeneous manner waiting to be used. In fact, depending on the final product to be obtained, the bars to be supplied to the user machine can also be of different types, for example of different length, different diameter, material, shape, surface working or other.

Normally each type of bar is supplied in homogeneous groups in which the bars are separated from each other, so that a first group can be formed by bars of a first type, a second group can be formed by bars of a second type, and so on.

On each occasion, each more or less numerous group of bars is picked up by one or more robotic automated pick-up devices or supplied by means of a roller transport device from the corresponding warehouse in which it is located, and delivered to the feed station of the user machine.

One of the disadvantages of robotic automated pick-up devices is that they do not allow to move a large number of bars at a time, they are very complex in design, especially the gripping means, they have high costs and require rather demanding technical management. Another disadvantage is the human-machine interactions, a very critical aspect in the case of robotic systems.

One of the disadvantages of roller transport devices is that they are not very versatile for changing the format of the bars and must in any case be fed by a bridge crane, an automated pick-up device or suchlike.

The feed station can be provided with a feed surface on which the group of bars is placed. Once the execution of a specific range of products is completed, the remaining bars scattered on the feed surface can, in some cases, be returned to the original warehouse.

The procedure for transferring the bars from the warehouse to the feed surface, and vice versa, is therefore extremely complex as it requires the use of dedicated structures, the presence of possible operators to guide and appropriately position, on each occasion, the movement of the bars from the warehouse to the work surface.

This operation to vary the type of bars, moreover, can also be very expensive in terms of time and can also cause downtimes of the user machines located downstream of the supply apparatus considered.

There is therefore a need to perfect an apparatus to feed bars that can overcome at least one of the disadvantages of the state of the art.

In particular, one purpose of the present invention is to provide an apparatus to feed bars that allows to feed bars in an orderly, quick and efficient manner.

Another purpose of the present invention is to provide a fully automated apparatus to feed bars that requires a limited number of operators to manage it.

Another purpose of the present invention is to provide an apparatus to feed bars that allows to supply the bars to user machines located downstream, avoiding machine downtimes to allow the operations to change the bar format.

Another purpose is to perfect a method that allows to feed the bars to a user machine that is efficient and automated.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the apparatus to feed bars, according to the present invention, for example to one or more user machines located downstream, comprises a support plane, a bar feed zone located in proximity to one bar supply end of the support plane, wherein the support plane comprises a unit to move the bars in a direction of movement from and toward the feed zone.

In accordance with one aspect of the present invention, the apparatus comprises a transfer device positioned in correspondence with the bar feed zone and configured to pass from a first position, in which it is above the support plane in order to support the bars and/or move the bars in a direction transverse to the direction of movement, to a second position, in which it is below the support plane in order to deposit the bars onto the support plane in correspondence with the bar feed zone.

The apparatus comprises a plurality of containing and translation units disposed adjacent to each other with respect to the direction of movement and configured, on each occasion, to contain and make available the bars.

The movement unit is configured to move the bars from the bar feed zone toward the containing and translation units and vice versa, and from the bar feed zone to the bar supply end.

Embodiments of the present invention also concern a method to feed bars to one or more user machines, which provides to move by means of a movement unit the bars on the support plane in a direction of movement from and toward the bar feed zone as above.

In accordance with one aspect of the present invention, the method provides that the transfer device that supports the bars in correspondence with the bar feed zone is moved from the first position, in which it is above the support plane in order to support the bars, to the second position, in which it is below the support plane in order to deposit the bars onto the support plane in correspondence with the bar feed zone.

The movement unit moves the bars, deposited on the support plane by the transfer device, from the bar feed zone toward the containing and translation units and vice versa, and from the bar feed zone toward the bar supply end, the containing and translation units being disposed adjacent to each other with respect to the direction of movement and configured to contain and make available the bars on each occasion.

ILLUSTRATION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments of the present invention concern an apparatus to feed bars B, indicated as a whole with reference number 10.

The bars B have a mainly oblong development and can have lengths even of several meters and have different diameters. The bars B can be supplied to the apparatus 10 in loose form, that is, distinct and separate since they are not bound together. In particular, the bars B supplied to the apparatus 10 can come from a cutting plant 100 located upstream of the apparatus 10, the cutting plant 100 (FIG. 1) providing to bring to measure much longer bars B in accordance with the feed requirements of the one or more user machines 200 located downstream of the apparatus 10.

In accordance with some embodiments, the apparatus 10 to feed bars B, for example to one or more user machines located downstream, comprises a support plane 11, a bar feed zone 12 located in proximity to one bar supply end 13 of the support plane 11, wherein the support plane 11 comprises a unit 14 to move the bars B in a direction of movement Z from and toward the bar feed zone 12.

In accordance with one aspect of the present invention, the apparatus 10 comprises a transfer device 18 positioned in correspondence with the bar feed zone 12 and configured to pass at least from a first position, in which it is above the support plane 11 in order to support the bars B and/or move the bars B in a direction transverse to the direction of movement Z, to at least a second position, in which it is below the support plane 11 in order to deposit the bars B onto the support plane 11 in correspondence with the bar feed zone 12.

The apparatus 10 comprises a plurality of containing and translation units 15 disposed adjacent to each other with respect to the direction of movement Z and configured, on each occasion, to contain and make available the bars B.

The movement unit 14 is configured to move the bars B from the bar feed zone 12 toward the containing and translation units 15 and vice versa, and from the bar feed zone 12 to the bar supply end 13.

In accordance with possible embodiments, the transfer device 18 can, for example, receive a plurality of bars B from a cutting plant 100 positioned upstream. In particular, the transfer device 18 can support the bars B during the cutting operation thereof and subsequently transfer, or possibly simply position, the bars B, brought to size, on the support plane 11 of the apparatus 10.

In accordance with some embodiments, the support plane 11 can be positioned horizontal in order to prevent the bars B from moving in an unwanted manner due to gravity.

The support plane 11 comprises two lateral edges between the bar supply end 13 and another longitudinal end opposite thereto.

The bar supply end 13 and the other longitudinal end have a length substantially equal to, or greater than, the length of the bars B to be processed.

The bars B, in fact, are deposited on the support plane 11, according to the modes described below, substantially parallel to the longitudinal development of the bar supply end 13 and of the other longitudinal end.

In particular, the bars B are deposited on the support plane 11 in correspondence with the bar feed zone 12 and are evacuated from the support plane 11 in correspondence with the bar supply end 13.

The bars B deposited on the support plane 11, thanks to the presence of the movement unit 14, can be uniformly distributed on the latter preventing overlapping or entanglements thereof, as well as homogeneously sorted according to at least one of their characteristics into dedicated collection zones.

In accordance with some embodiments, each containing and translation unit 15 comprises at least two containing elements 16 distanced and aligned in a longitudinal direction L, transverse to the direction of movement Z, coordinated with each other and selectively movable to pass at least from a containing position, in which they are positioned below the support plane 11 and are suitable to support a respective group of bars B, to at least a release position, in which they are positioned above the support plane 11 in order to release the bars B onto the support plane 11.

Each containing and translation unit 15 also comprises at least two movement devices 17 positioned in correspondence with the containing elements 16 and aligned in the longitudinal direction L, coordinated with each other in order to pass at least from a lowered condition, in which they are parallel to the support plane 11 and allow the bars B to move, to at least a raised condition in which they are raised in order to allow access to the respective containing elements 16.

In accordance with some embodiments, shown in FIGS. 2-3 and FIGS. 6-15, the movement devices 17 are distinct and autonomous components with respect to the respective containing elements 16, wherein said movement devices 17 are mobile independently of the respective containing elements 16 in order to independently pass respectively from the lowered condition to the raised condition, and from the containing position to the release position, possibly through respective intermediate conditions and positions.

Figure 1:
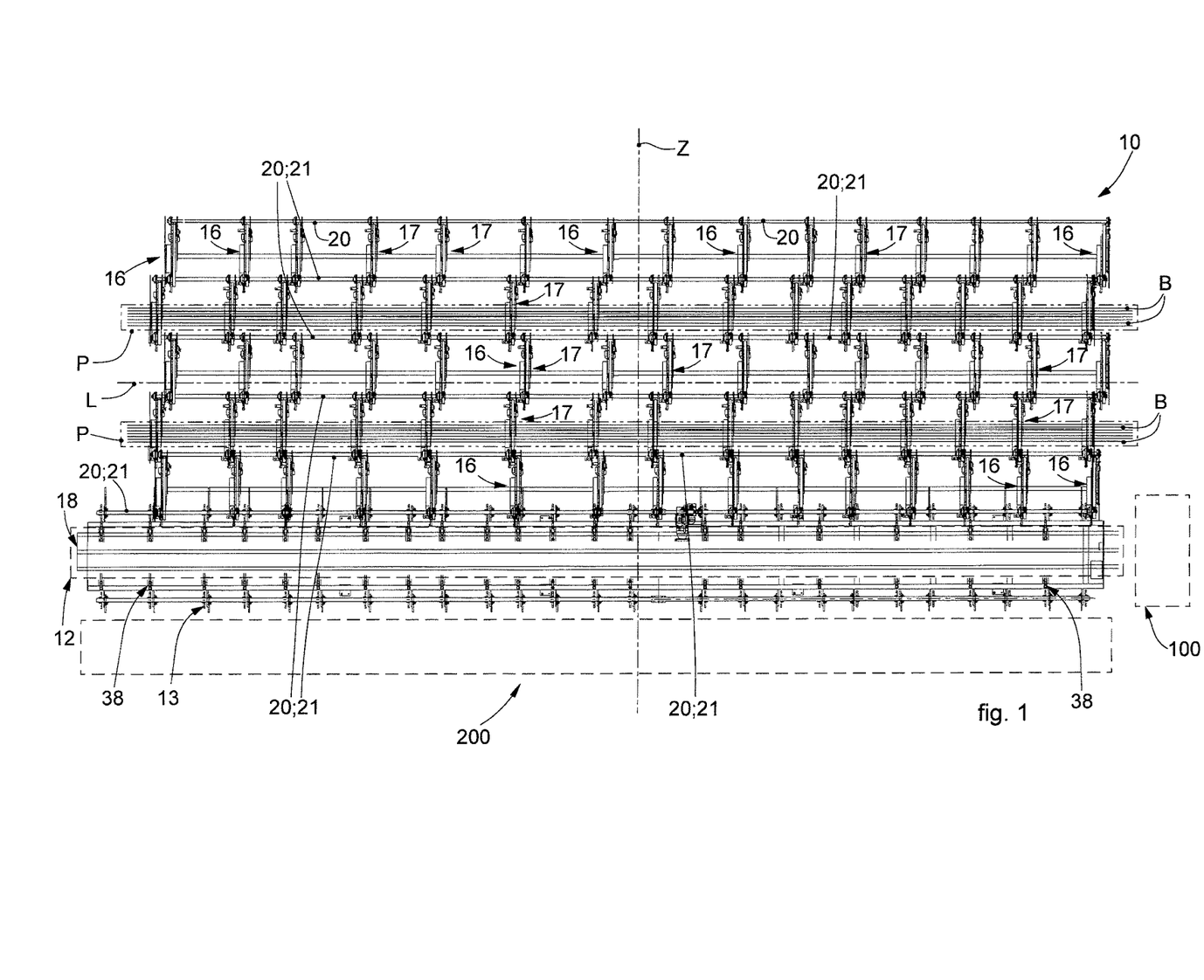
FIG. 1 is a plan view of an apparatus to feed bars according to the present invention.

In accordance with some embodiments, shown in FIG. 1, each movement device 17 is positioned in an offset configuration with respect to the respective containing element 16. In particular, each movement device 17 is offset in the longitudinal direction L with respect to the respective containing element 16 so as to prevent possible reciprocal interferences during their reciprocally independent movement.

Figure 2:
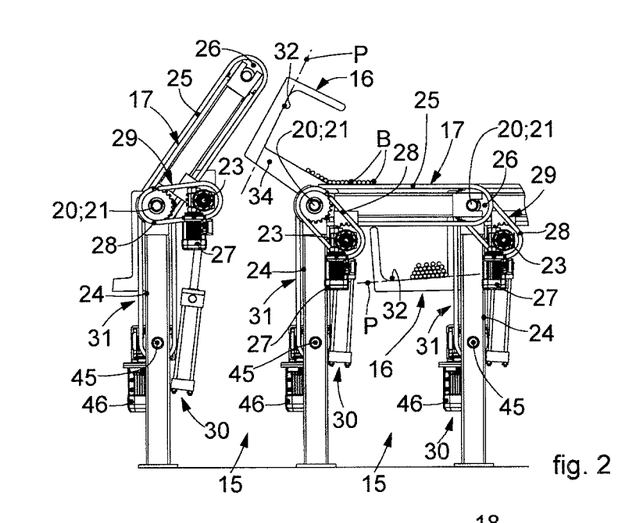
FIGS. 2-3 are lateral elevation views of a containing and translation unit of the apparatus of FIG. 1.
Figure 3:
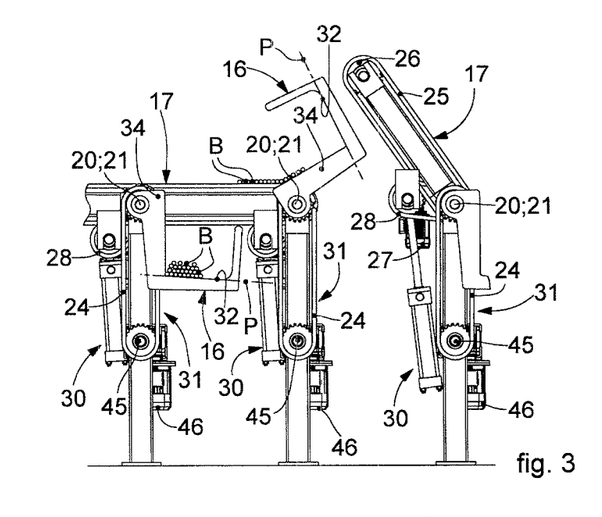

In accordance with some embodiments, shown in FIGS. 2-3, each containing and translation unit 15 comprises a first transmission shaft 20 and a second transmission shaft 21 parallel to the longitudinal direction L and with which the movement devices 17 and the containing elements 16 are associated.

Figure 4:
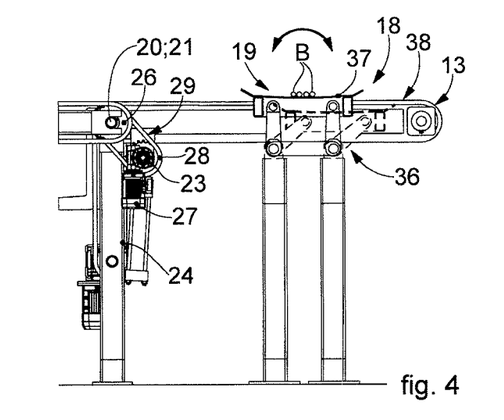
FIGS. 4-5 are lateral elevation views of the transfer device of the apparatus of FIG. 1.

Each containing and translation unit 15 shares, with the adjacent one, the first transmission shaft 20 on one side and the second transmission shaft 21 on the other side. It is understood that, simply for convenience of description, here and hereafter we will refer, for each containing and translation unit 15, to first 20 and second 21 transmission shaft although, as can be seen in the examples of FIGS. 3-4, by way of example the second transmission shaft 21 shared with an adjacent containing and translation unit 15 is the first transmission shaft 20 of the latter.

In accordance with some embodiments, shown in FIGS. 2-3, each movement device 17 has a first end pivoted to the first transmission shaft 20 and with respect to which the movement device 17 is suitable to rotate, in order to pass from the lowered condition to the raised condition and vice versa.

Each movement device 17 has a second end, opposite the first end, positioned in correspondence with the second transmission shaft 21 and which can be selectively raised by the respective second transmission shaft 21 in order to allow access to the containing element 16.

Each containing element 16 has a pivoting portion 34, pivoted to the second transmission shaft 21, with respect to which it can rotate in order to pass from the containing position to the release position and vice versa.

Each containing element 16 is configured to rotate in the opposite sense to the sense of rotation of the respective movement device 17.

In accordance with some embodiments, shown in FIGS. 2-3 and FIGS. 9-10 and FIGS. 12-14, each movement device 17 can be raised in rotation with respect to the support plane 11 by an angle of rotation comprised between about 1° and about 90° and in any case sufficient to allow the rotation of the containing elements 16 in order to unload the bars onto the support plane 11, without reciprocal interferences occurring, or to allow to unload the bars B from the support plane 11 into the containing elements 16.

In accordance with some embodiments, shown in FIGS. 2-3, with each containing and translation unit 15 there is associated at least one respective first actuation unit 29, configured to activate the movement devices 17 in order to move the bars B on the support plane 11, at least one respective second actuation unit 30, provided to allow the movement devices 17 to pass from the lowered condition to the raised condition and vice versa, and at least one third actuation unit 31 provided to allow the containing elements 16 to pass from the containing position to the release position and vice versa.

In accordance with some embodiments, the first actuation unit 29, the second actuation unit 30 and the third actuation unit 31 can be selectively activated/deactivated in a distinct and separate manner with respect to each other.

In accordance with possible embodiments, each containing and translation unit 15 can comprise respective synchronization devices associated with the first actuation unit 29 and with the second actuation unit 30 in order to guarantee respectively a uniform and parallel translation of the bars B in the direction of movement Z, and to guarantee an angularly uniform and simultaneous raising/lowering of the movement devices 17.

In accordance with possible embodiments, each containing and translation unit 15 can comprise further synchronization devices associated with the third actuation unit 31 in order to move the containing elements 16 simultaneously.

According to possible solutions of the invention, the actuation units 29, 30, 31 can comprise at least one of either a jack, a linear actuator, sliding guides, chain mechanisms, rack or worm screw mechanisms, or suchlike.

In accordance with some embodiments, the first actuation unit 29 comprises a drive device 27 and a transmission device 28, for example of the chain type.

The transmission device 28 is configured to transmit the motion generated by the drive device 27 to the first transmission shaft 20 in order to activate, in a coordinated and simultaneous manner, the movement devices 17.

The transmission device 28 is associated on one side with the first transmission shaft 20 and on the other side with an auxiliary shaft 23 parallel to the first transmission shaft 20 and connected to the movement devices 17 of a same containing and translation unit 15.

In accordance with some embodiments, the second actuation unit 30 comprises a linear actuator which has an operating end associated with the auxiliary shaft 23 in order to raise/lower the movement devices 17.

In accordance with some embodiments, the third actuation unit 31 comprises a chain mechanism 24 connected with respect to a first end to the second transmission shaft 21 and with respect to a second end opposite the first end to a motor shaft 45 rotated by at least one motor 46. The motor shaft 45 is parallel to the second transmission shaft 21 and can be advantageously positioned below it.

In accordance with possible embodiments, each movement device 17 can be moved individually and autonomously with respect to the others. For this purpose, with each movement device 17 of a same containing and translation unit 15 there can be associated a respective first actuation unit 29 and a respective second actuation unit 30.

In accordance with possible embodiments, each containing element 16 can be moved individually and autonomously with respect to the others. For this purpose, with each containing element 16 of a same containing and translation unit 15 there can be associated a respective third actuation unit 31.

Advantageously, the distinct and separate movement of each movement device 17 and of each containing element 16 allows the apparatus 10 to be very versatile and efficient. For example, if it is necessary to store and pick up bars B of a very short length, it is possible to only drive the movement devices 17 in correspondence with the bars B to be picked up/stored. In particular, the apparatus 10 can be equipped with detection devices configured to detect the presence of one of the bars B in contact with the movement devices 17.

In accordance with some embodiments, shown in FIGS. 16-22, each movement device 17, together with the respective containing element 16, constitutes a single mobile movement body 47 in order to allow a first portion thereof, corresponding to the movement device 17, to pass from the lowered condition to the raised condition, possibly through possible intermediate conditions, and a second portion thereof, corresponding to the containing element 16, to pass from the containing position to the release position, possibly through possible intermediate positions.

Although the movement body 47 is physically a single component as described above, hereafter we will refer, however, to the first portion as above, corresponding to the movement device 17 and to the second portion as above, corresponding to the containing element 16, which at a functional level continue to carry out distinct and separate, or different, actions.

Figure 19:
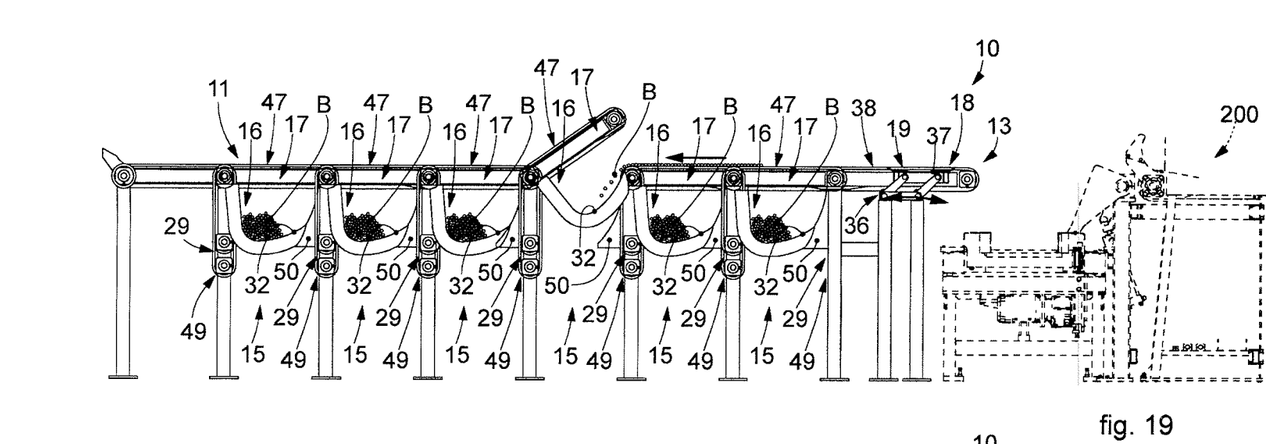
FIGS. 19-22 are lateral elevation views of a possible operating sequence of the functioning of the apparatus in FIG. 1 provided with the containing and translation units of FIGS. 16-18.

In particular, in the raised condition, the first portion, corresponding to the movement device 17, is inclined upward, with respect to the support plane 11, by an angle of rotation which varies between about 30° and about 50°, thus allowing access to the respective containing element 16 which is still in the containing position, FIG. 19.

Figure 18:
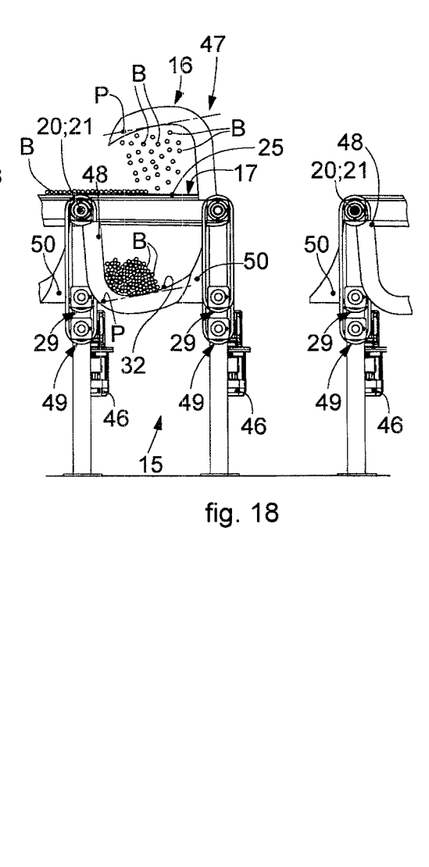
Figure 21:
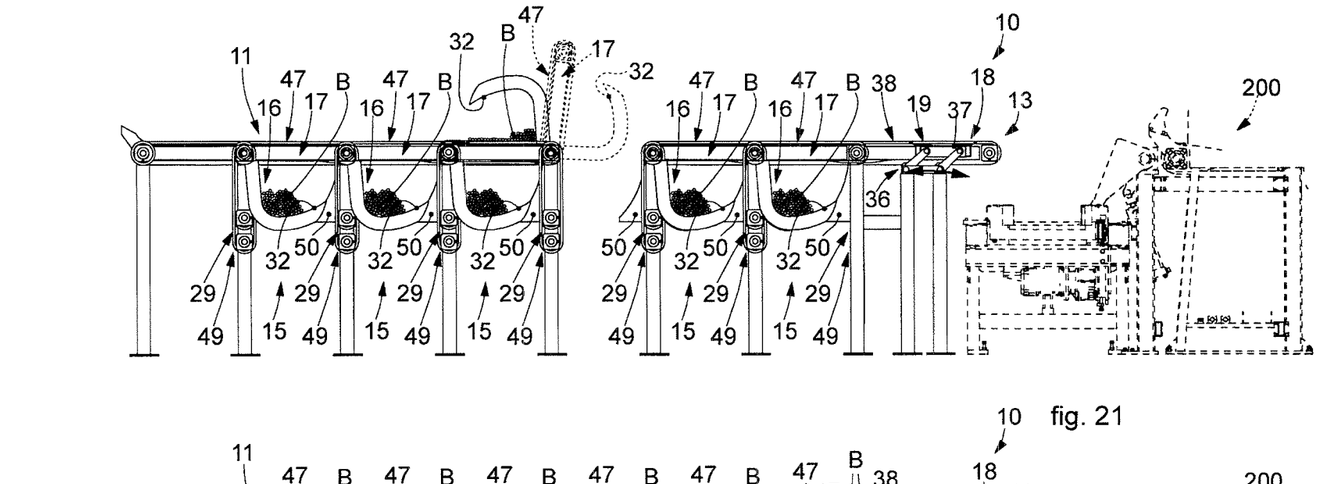

In accordance with some embodiments, when the containing element 16 is in the release position, the respective movement device 17 is inclined with respect to the support plane 11 by an angle of rotation of approximately 180°, being substantially in a position turned over with respect to the lowered condition and cooperating with the movement device 17 of the adjacent containing and translation unit 15 in order to allow the bars B to move on the support plane 11, FIG. 18 and FIG. 21.

For this purpose, it is necessary for the movement bodies 47 of adjacent containing and translation units 15 to be offset with respect to each other in the longitudinal direction L.

In accordance with some embodiments, similarly to the example described in FIGS. 2-15, each containing and translation unit 15 comprises a first transmission shaft 20 and a second transmission shaft 21, both parallel to the longitudinal direction L.

In particular, each movement body 47 has, between the first portion corresponding to the movement device 17 and the second portion corresponding to the containing element 16, an intermediate pivoting portion 48 with respect to which the movement body 47 is rotatably associated with the respective first transmission shaft 20.

In accordance with some embodiments, each containing element 16 can comprise a support 50 attached to the frame of the apparatus 10 and suitable to support, at least partly, the containing element 16 when it is in the containing position as above, so as to prevent an excessive weight of the bars B weighing on the containing elements 16 from causing an excessive torque on the intermediate pivoting portions 48.

In accordance with some embodiments, the movement bodies 47 of a same containing and translation unit 15 move with respect to each other in a coordinated manner, for example thanks to the aid of mechanical or electronic synchronization devices.

In accordance with some embodiments, with each containing and translation unit 15 there is associated at least one respective first actuation unit 29, configured to activate the movement devices 17 in order to move the bars B onto the support plane 11 and an actuation assembly 49, independent from the actuation unit 29, provided to move the movement body 47 in rotation.

In accordance with some embodiments, the actuation assembly 49 comprises, for example, a chain mechanism connected with respect to a first end to the first transmission shaft 20, and with respect to a second end opposite the first end to a motor shaft by at least one motor 46. Obviously, this is just one possible embodiment of the actuation assembly 49 which, for example, can comprise a hydraulic lifting device, a worm screw or other suitable movement device.

In accordance with some embodiments, shown in FIGS. 2-3 and FIGS. 16-18, each movement device 17 comprises a transmission member 25 which can be selectively moved in a closed loop around return members 26.

The transmission member 25 defines, between the return members 26, return segments, at least one of which lies on the support plane 11 and is disposed in the direction of movement Z.

In particular, it can be provided that the return segment comprised between the return members 26 has at least one support surface, facing toward the outside and lying on the support plane 11.

Each return segment of the transmission members 25 is located in contact with a portion of the bars B, causing the distribution and movement of the bars B at least on one portion of the support plane 11.

In accordance with some embodiments, shown in FIG. 1, between two adjacent movement devices 17 of a same containing and translation unit 15 there comes to be defined an interspace in which the bars B are not supported.

In accordance with possible embodiments, the interspaces as above can all have the same size.

In accordance with other possible embodiments, the interspaces as above can have a variable size.

According to possible embodiments of the present invention, the transmission member 25 can be selected from a group comprising at least one of either a chain, a belt, or a cable.

Figure 16:
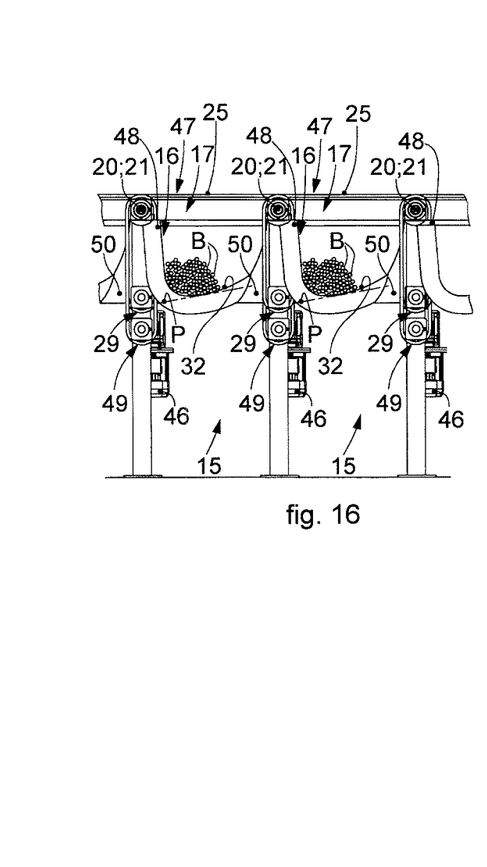
FIGS. 16-18 are lateral elevation views of a possible embodiment of containing and translation units of the apparatus described here.
Figure 17:
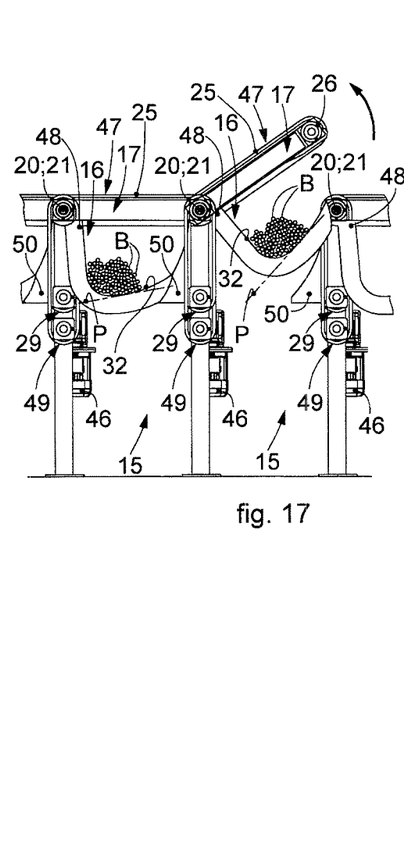

In accordance with the embodiment shown in FIGS. 2-3 and in FIGS. 16-18, the transmission members 25 comprise a chain, for example of the roller type. The choice of a roller chain, thanks to the irregularity of the support surface defined by the links that make up the chain, allows to generate vibrations on the bars B such as to induce a homogeneous distribution thereof on the support plane 11, that is, on a portion thereof.

The return members 26 can comprise at least one of either wheels, pulleys, or toothed crowns, suitable to allow the transmission member 25 to be wound around them.

In accordance with possible solutions, the return members 26 comprise toothed crowns, FIG. 3, on which the links of the roller chains mesh. This embodiment guarantees that there is not a reciprocal sliding between the return members 26 and the transmission members 25.

In accordance with possible embodiments, the containing and translation units 15 are suitable to each accommodate a different type of bars B, for example of different sizes, different length, different types of material, or suchlike.

In accordance with some embodiments, shown for example in FIGS. 2-3 and in FIGS. 16-18, each containing element 16 has a concave conformation with concavity open upward in order to receive, in cooperation with the other containing elements 16, the bars B.

Each containing element 16 can be provided with a housing seating 32 open, during use, upward and suitable to support a portion of the bars B.

In particular, each housing seating 32 partly supports the bars B so that the bars B are supported discontinuously, but substantially for their entire length.

In accordance with some embodiments, shown in FIGS. 2-3, each housing seating 32 is substantially U-shaped.

In accordance with some embodiments, shown in FIGS. 16-18, each housing seating 32 is substantially L-shaped, provided with a terminal end slightly curved upward in order to allow to contain the bars B even in a partly rotated condition.

The containing elements 16 of a same containing and translation unit 15 are positioned at the same height so that the respective housing seatings 32 define a discontinuous housing plane P to support the stored bars B, FIGS. 1-3 and FIGS. 16-18.

With particular reference to FIGS. 2-3 and FIGS. 16-18, when the containing elements 16 of a same containing and translation unit 15 are in the containing position as above, the housing seatings 32 are below the support plane 11 and the housing plane P is substantially parallel to the support plane 11. When the containing elements 16 of a same containing and translation unit 15 are in the release position as above, the housing seatings 32 are above the support plane 11 and the housing plane P is substantially inclined with respect to the support plane 11 in order to allow the bars B to be unloaded onto the support plane 11.

In accordance with some embodiments, the transfer device 18 comprises a support structure 19 on which the bars B are positioned, and at least one lifting unit 36 associated with the support structure 19 so as to allow the support structure 19 to pass from the first position to the second position and vice versa.

In accordance with some embodiments, shown in FIG. 4, the at least one lifting unit 36 is provided with a pantograph mechanism that allows to pass from the first position to the second position as above and vice versa, with a rotation movement defining a partial translation of the support structure 19 in the direction of movement Z.

In this way, the bars B are positioned on the support structure 19 and can be subsequently moved by the movement unit 14 toward the containing and translation units 15 or toward the bar supply end 13. For example, in the event the number of bars B to be deposited on the support plane 11 is large, it may be advantageous to unload the bars B in the direction of the containing and translation units 15 in order to prevent the bars B from falling from the support plane 11 in correspondence with the bar supply end 13.

In accordance with some embodiments, the movement unit 14 comprises auxiliary movement devices 38 positioned in correspondence with the bar feed zone 12, between the bar supply end 13 and the movement devices 17 of the first containing and translation unit 15. In particular, the auxiliary movement devices 38 are configured to move the bars B from the bar feed zone 12 toward the containing and translation units 15 and vice versa, and from the bar feed zone 12 toward the bar supply end 13.

Advantageously, the auxiliary devices 38 can have an extension, in the direction of movement Z, suitable to allow to unload the bars B contained in the nearest containing unit 15 and to allow to unload the bars B therein.

In accordance with possible solutions, the auxiliary movement devices 38 can have the same conformation and the same characteristics as the movement devices 17 as described above.

Figure 5:
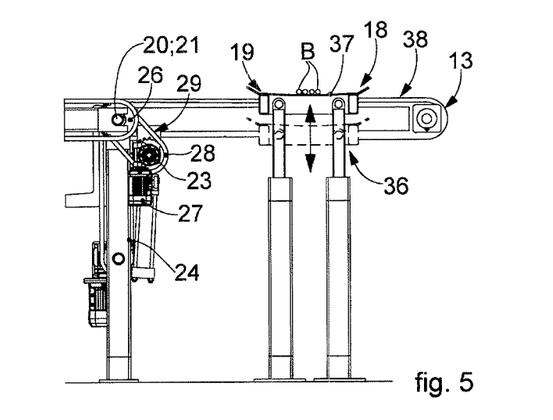

In accordance with some embodiments, shown in FIG. 5, the at least one lifting unit 36 is provided with a vertical translation mechanism configured to move the support structure 19 in a vertical direction incident and orthogonal to the support plane 11 between the first position and the second position as above and vice versa.

In accordance with possible solutions, the translation mechanism can be selected from a group comprising a jack, a linear actuator, sliding guides, chain mechanisms, rack or worm screw mechanisms, or suchlike.

In accordance with some embodiments, the support structure 19 is defined by support elements 37 disposed aligned in succession in a direction orthogonal to the direction of movement Z and in an offset position with respect to the movement unit 14, FIG. 1. In this way, in the passage from the first position to the second position there is no reciprocal interference between the movement unit 14 and the support plane 11 with the transfer device 18.

In accordance with possible embodiments, with each of the support elements 37 there is associated a respective lifting unit 36, the lifting units 36 being synchronized to each other in order to allow the simultaneous passage of the support elements 37 of the support structure 19 from the first position to the second position and vice versa.

In accordance with possible solutions, not shown, the support structure 19 can comprise, or be defined by, transfer rollers configured to support the bars B and to move them in the transverse direction as above.

Embodiments described here also concern a method to feed bars B to one or more user machines, which provides to move by means of a movement unit 14 the bars B on the support plane 11 in the direction of movement Z from and toward the bar feed zone 12.

In accordance with one aspect of the present invention, the method provides that the transfer device 18 that supports the bars B in correspondence with the bar feed zone 12 is moved from the first position, in which it is above the support plane 11 in order to support the bars B, to the second position, in which it is below the support plane 11 in order to deposit the bars B onto the support plane 11 in correspondence with the bar feed zone 12.

The movement unit 14 moves the bars B, deposited on the support plane 11 by the transfer device 18, from the bar feed zone 12 toward the containing and translation units 15 and vice versa, and from the bar feed zone 12 toward the bar supply end 13, the containing and translation units 15 being disposed adjacent to each other with respect to the direction of movement Z and configured to contain and make available the bars B on each occasion.

With reference to FIGS. 6-11, a possible operating sequence of the functioning of the apparatus 10 of FIG. 1 is described, in which the movement devices 17 and the respective containing elements 16 are distinct and separate from each other.

When it is necessary to feed bars B, which have a length, to one or more user machines and/or to store bars B, which have a specific length, such bars B are moved by the transfer device 18, which is in the first portion as above, in a direction transverse to the direction of movement Z, so that at the end of said movement the bars B are substantially parallel to the bar supply end 13 and aligned in the direction of movement Z with the containing and translation units 15, FIG. 1.

Subsequently, the transfer device 18 is taken from the first position to the second position by means of the at least one lifting unit 36, and the bars B supported by the device 18 are transferred by interference onto the support plane 11, in particular onto the auxiliary movement devices 38, FIG. 2.

Figure 6:
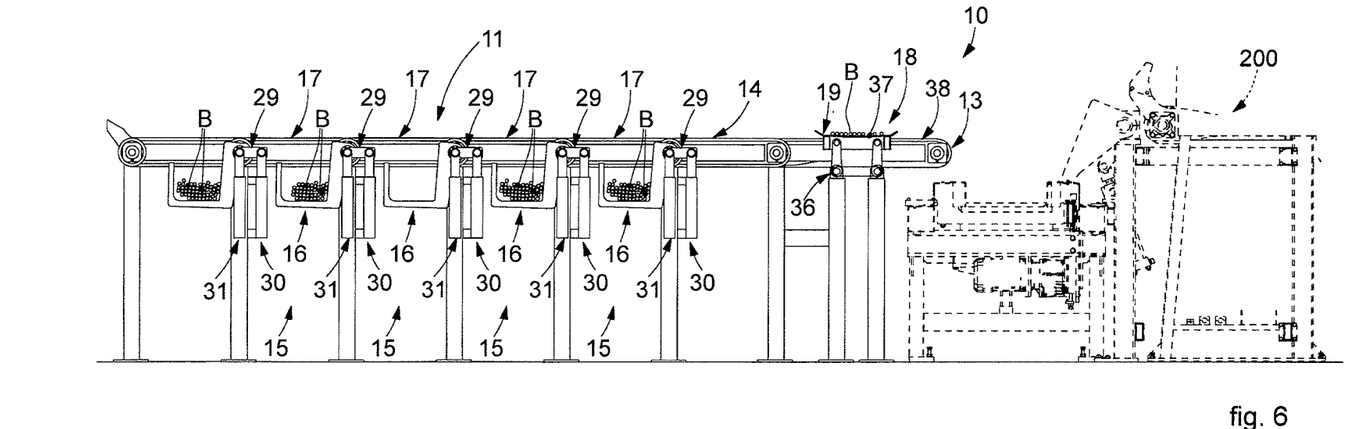
FIGS. 6-8 are lateral elevation views of a possible operating sequence of the functioning of the apparatus of FIG. 1.
Figure 7:
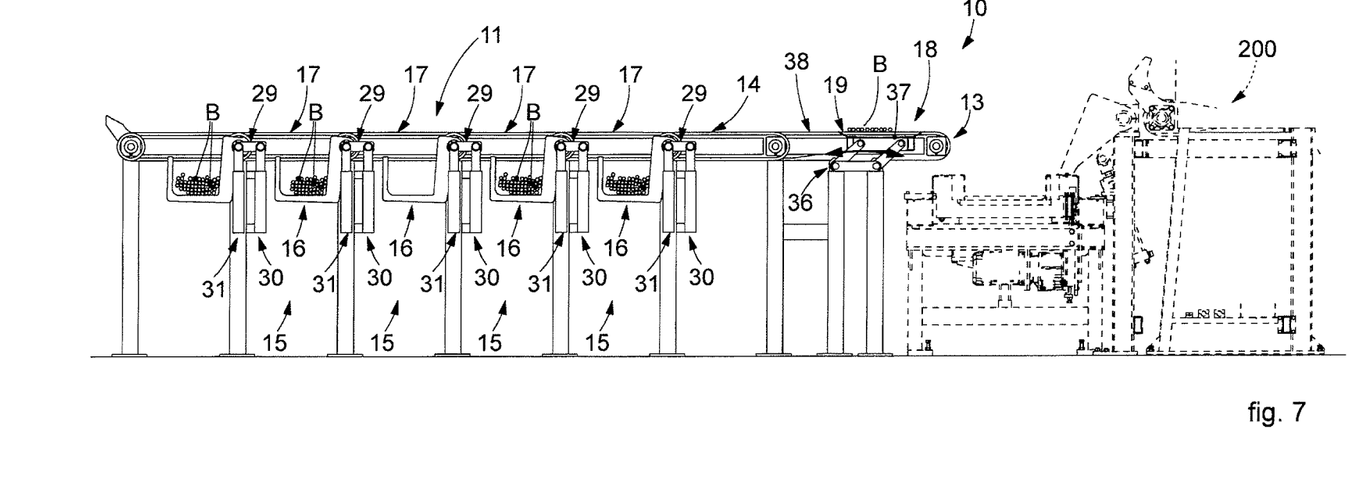
Figure 8:
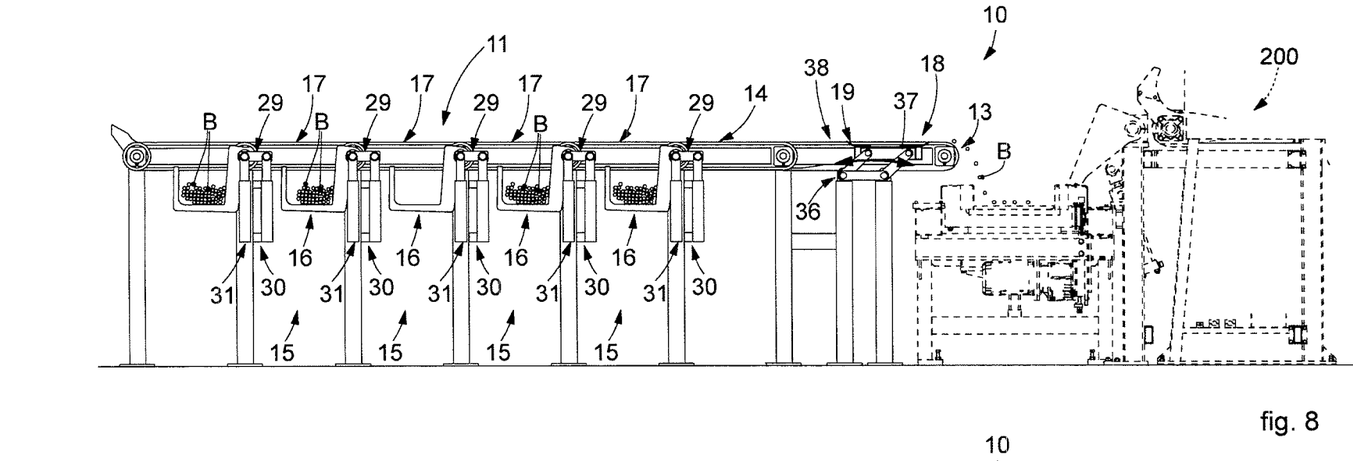
Figure 9:
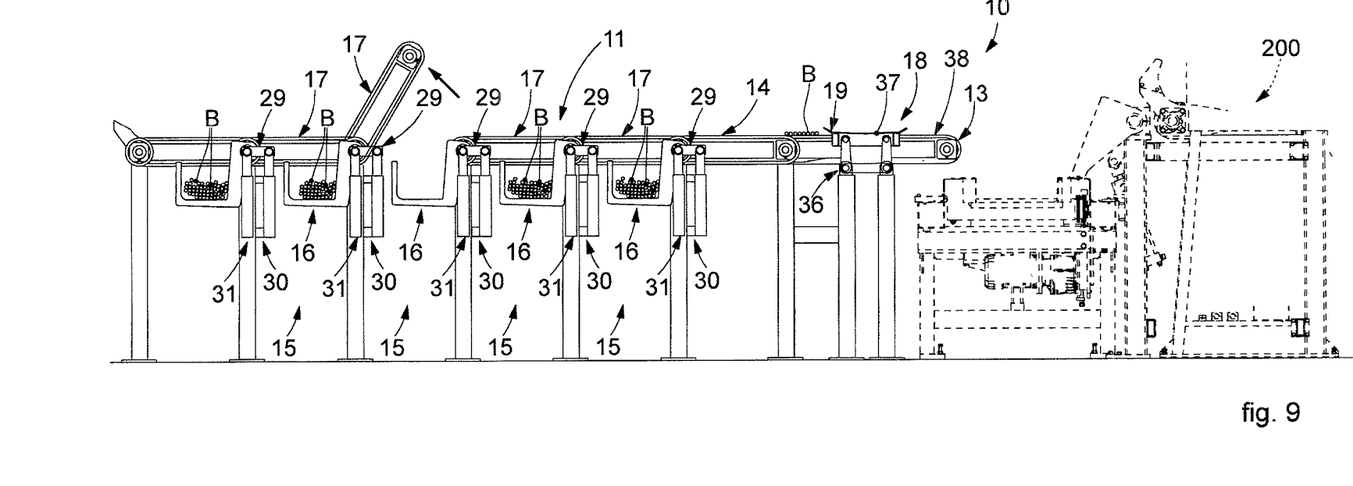
FIGS. 9-11 are lateral elevation views of another possible operating sequence of the functioning of the apparatus of FIG. 1.
Figure 10:
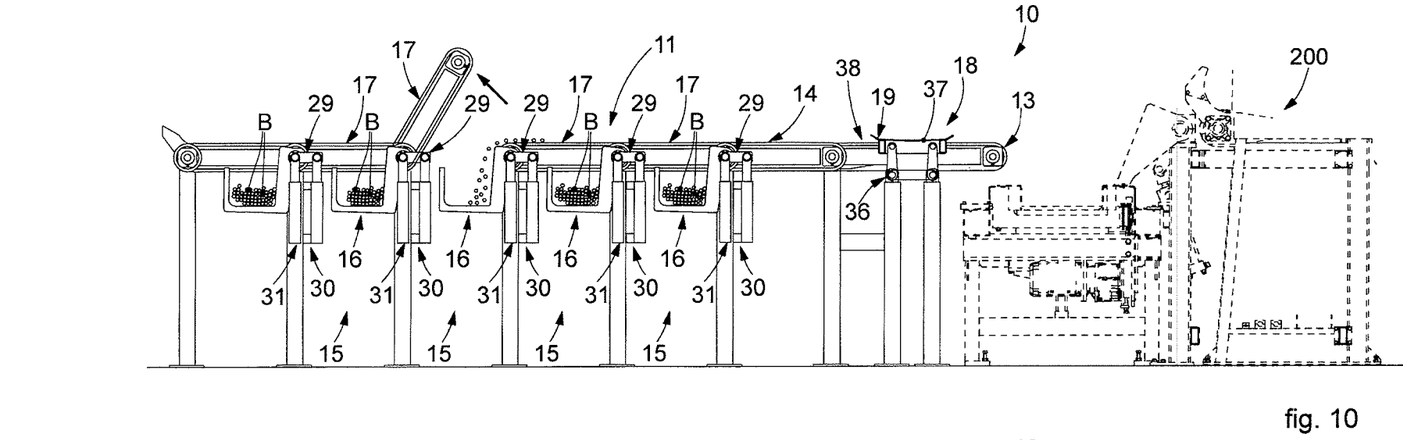
Figure 11:
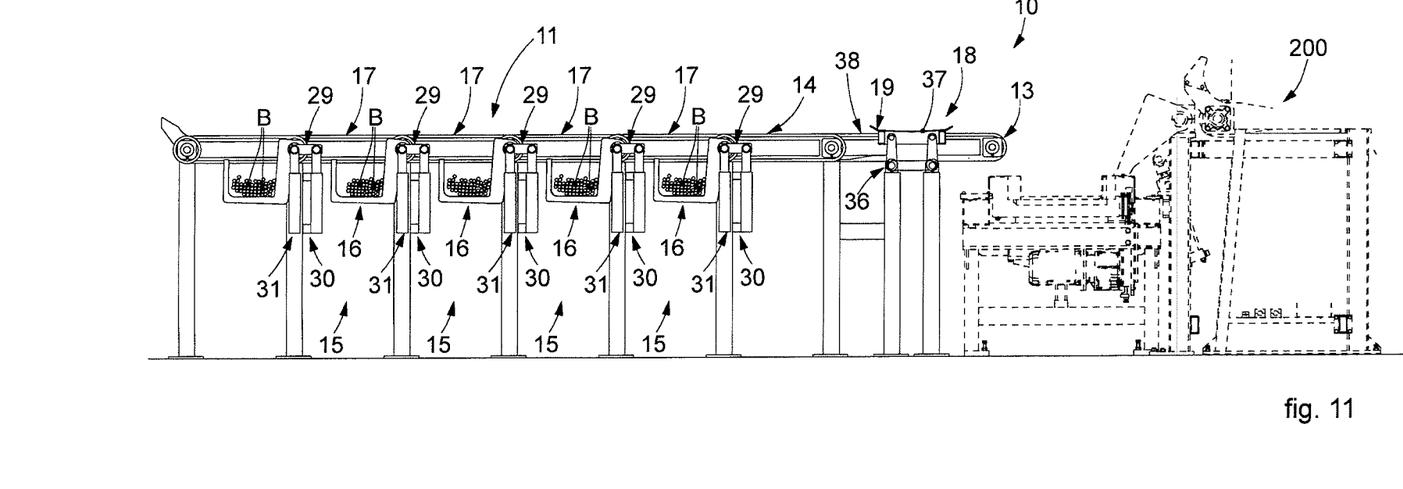

The bars B just unloaded onto the support plane 11 can be, in a first case, directly transferred to the user machine 200 located downstream for the subsequent workings, FIGS. 6-8, or, in a second case, they can be stored in one or more of the containing and translation units, FIGS. 9-11.

In the first case, the bars B are moved by the auxiliary movement devices 38 toward the bar supply end 13, from which they fall and/or are picked up in order to be positioned on the feed surface of the user machine 200, FIG. 7. Possibly, in correspondence with the bar supply end 13, the bars B can be counted automatically, in the event that feeding a precise number of bars B is required.

In the second case, the bars B are moved in the direction of movement Z toward the other longitudinal end, first by the auxiliary movement devices 38 and then by the movement devices 17 positioned upstream of the containing and translation unit 15 used for storage, the movement devices 17 of which are in the raised condition, FIG. 9. The movement devices 17 located in the lowered position uniformly distribute the bars B on the support plane 11 and move them in the direction of movement Z until they cause them to fall inside the containing elements 16, FIG. 10. At the same time, the transfer device 18 returns to the first position in order to move and support another group of bars B which can have other characteristics.

Once the movement of the bars B has ended, the bars B are positioned inside the containing elements 16, in particular in the housing seatings 32 of the containing elements 16, as they wait to be moved in order to be used at a later stage. Once such movement has ended, the movement devices 17 of the containing and translation unit 15 used to store the bars B are moved from the raised condition, FIG. 10, to the lowered condition, FIG. 11.

With reference to FIGS. 12-15, another possible operating sequence of the functioning of the apparatus 10 of FIG. 1 is now described, in which the movement devices 17 and the respective containing elements 16 are distinct and separate from each other.

Figure 12:
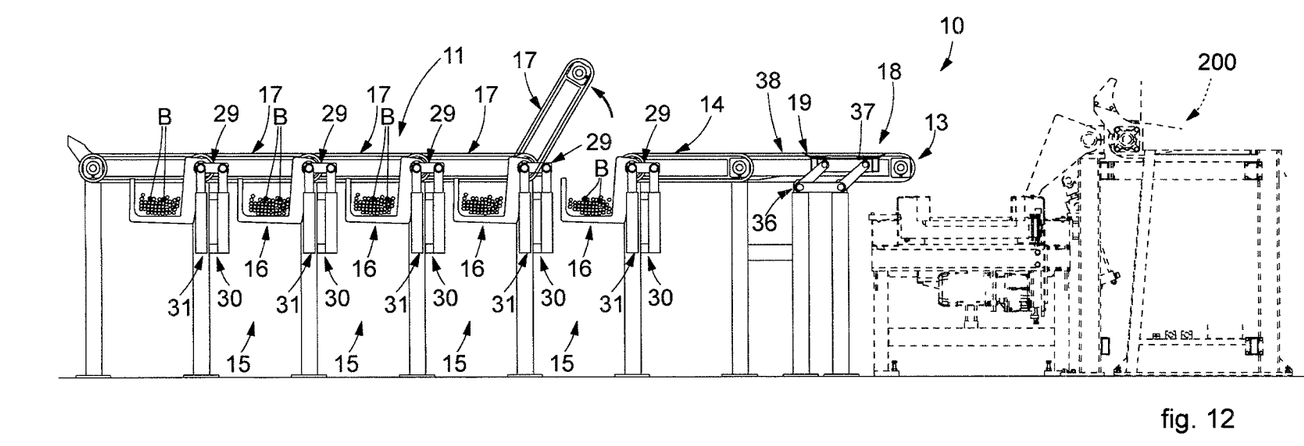
FIGS. 12-15 are lateral elevation views of another possible operating sequence of the functioning of the apparatus of FIG. 1.
Figure 13:
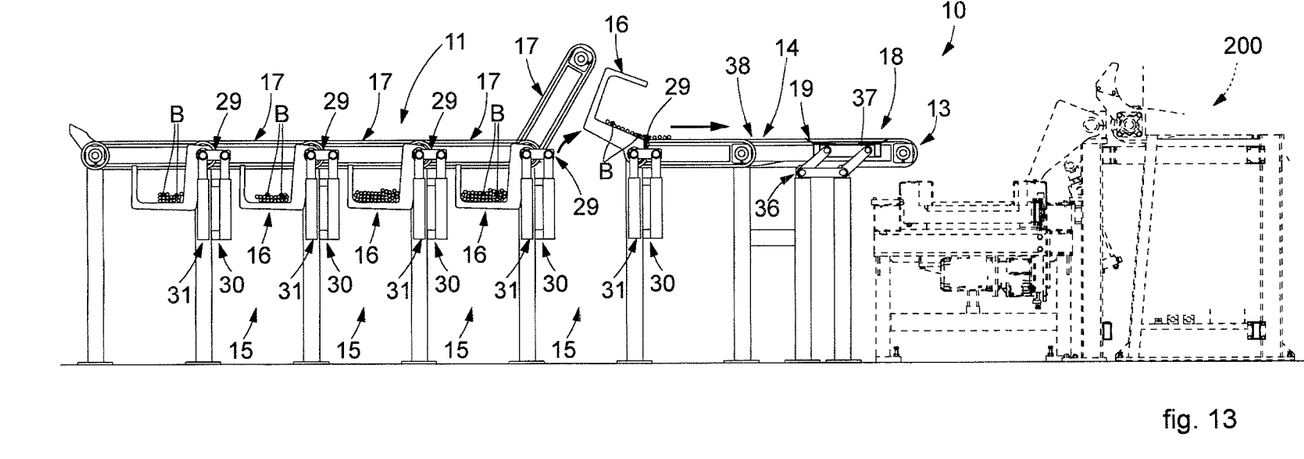

When a user machine 200 located downstream of the apparatus 10 requires a determinate number of bars B positioned in a specific containing and translation unit 15 to be fed, the corresponding movement devices 17 are moved from the lowered condition to the raised condition, FIG. 12, so as to make the access to the respective containing elements 16 available, and the transfer device 18 is taken into the second position as above. The containing elements 16 are taken into the release condition as above, in order to allow the bars B contained therein to be unloaded onto the support plane 11, in particular on the part of the plane upstream of the containing and translation unit 15. At the same time, FIG. 13, the movement devices 17 of the containing and translation units 15 upstream of the containing and translation unit 15 used for the picking up, or possibly the auxiliary movement devices 38, are driven in order to move the bars B toward the bar supply end 13 from which they fall and/or are picked up in order to be positioned on the feed surface of the user machine 200.

Figure 14:
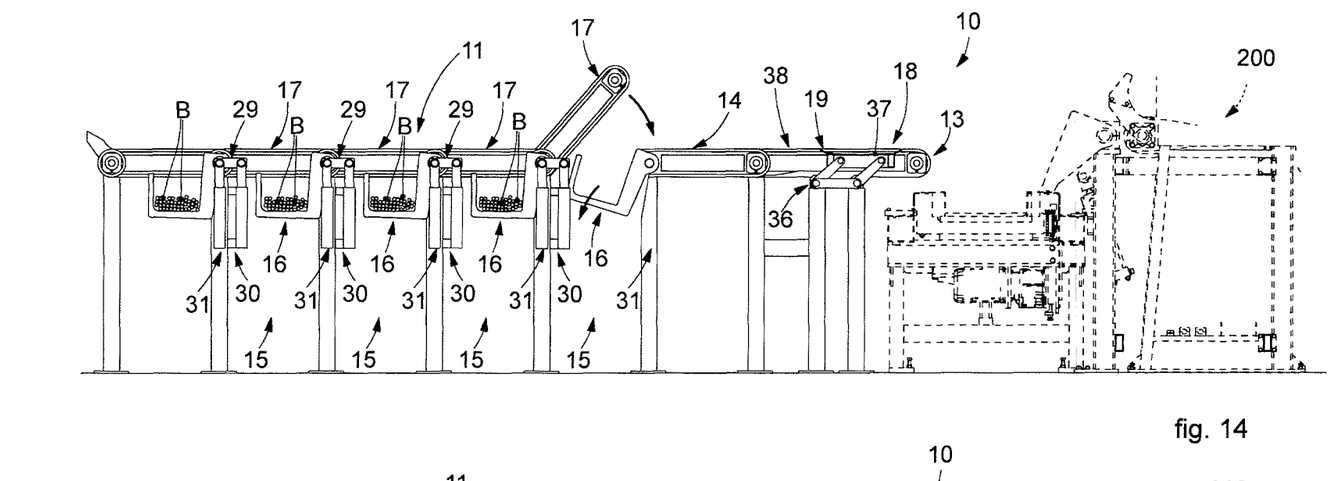
Figure 15:
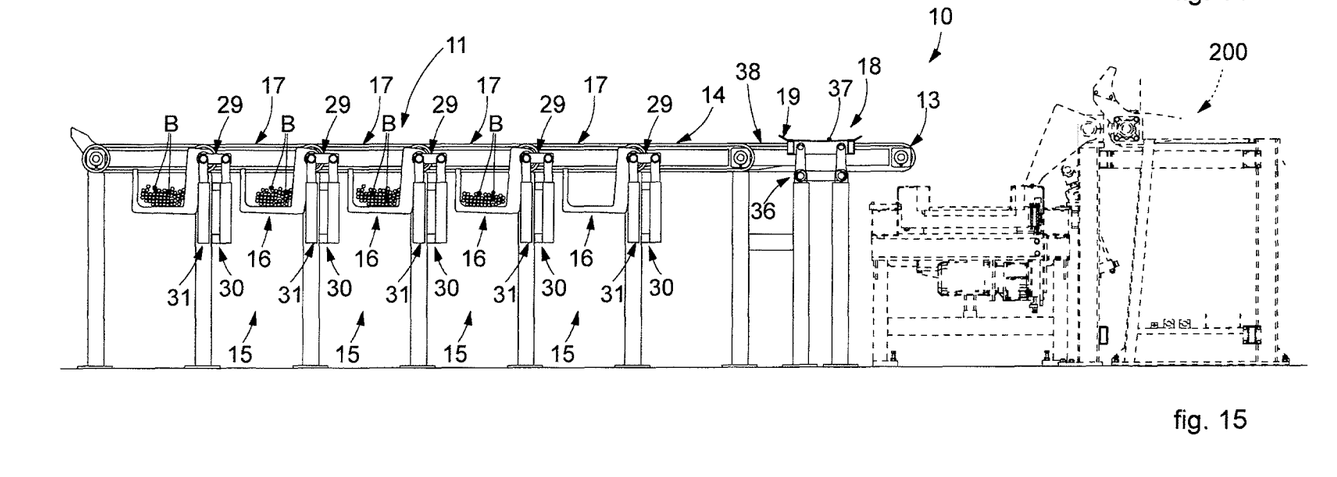

Once the unloading of the bars B onto the support plane 11 has ended, the containing elements 16 are taken from the release condition to the containing condition, and the respective movement devices 17 are taken from the raised condition to the lowered condition, FIG. 14-15.

With reference to FIGS. 19-22, a possible operating sequence of the apparatus 10 of FIG. 1 is shown, in which the movement devices 17 and the respective containing elements 16 define respective movement bodies 47, as shown in FIGS. 16-18.

Figure 20:
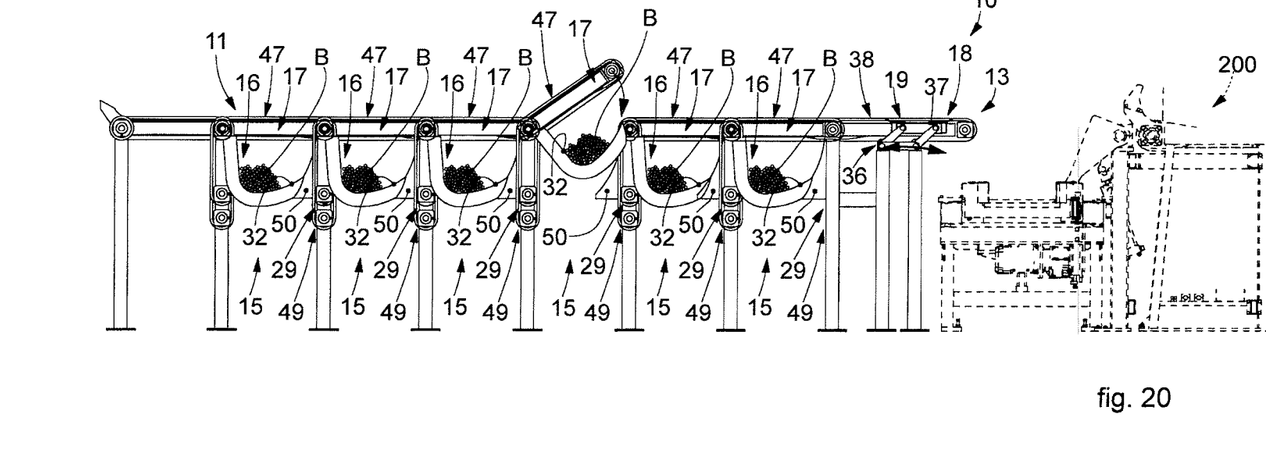

In particular, with reference to FIGS. 19-20, a possible operating sequence is shown for storing a determinate number of bars B in a containing and translation unit 15.

The bars B moved by the transfer device 18 and positioned thereby onto the support plane 11 in the modes already described previously, are moved by means of the movement devices 17 of the containing and translation units 15 upstream of the containing and translation unit 15 used for storage toward the latter. In particular, the first portion corresponding to the movement device 17 of the containing and translation unit 15 used for storage is inclined upward, with respect to the support plane 11, by an angle of rotation of about 45°, allowing access to the respective containing element 16 which, although rotated, is still in the containing position in order to receive the bars B, FIG. 19.

Once the movement of the bars B has ended, the bars B are positioned in the housing seatings 32 of the containing elements 16, waiting to be moved in order to be used at a later stage. Once the step of storing the bars B is completed, the movement devices 17 of the containing and translation unit 15 used to store the bars B are moved from the raised condition to the lowered condition, FIG. 20.

Figure 22:
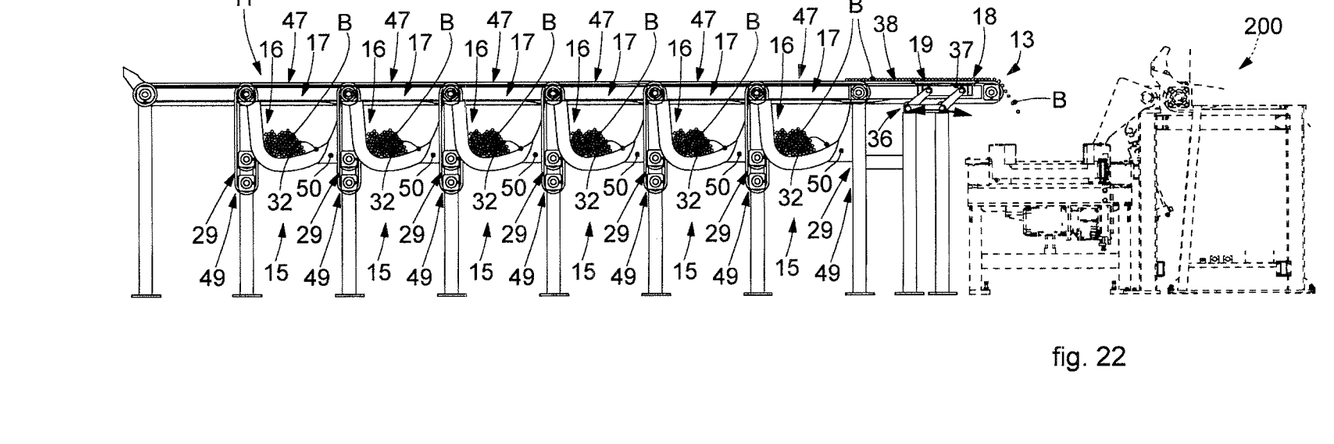

With reference to FIGS. 21-22, a possible operating sequence is shown for feeding a determinate number of bars B, contained in a containing and translation unit 15, to the support plane 11 and subsequently toward the user machine 200 located downstream.

The movement body 47 of the containing and translation unit 15, containing the bars B to be processed, is rotated so that the containing elements 16 are in the release position as above and the respective movement devices 17 are turned over by 180° with respect to the support plane 11, being parallel and coplanar with the latter.

Once the unloading of the bars B onto the support plane 11 has ended, the movement body 47 rotates in the opposite sense until the respective containing elements 16 are returned to the containing position as above, and the respective movement devices 17 are taken into the lowered condition.

Subsequently, the movement devices 17 cooperate with the movement devices 17 of the containing and translation unit 15 located upstream in order to allow the bars B to move on the support plane 11 toward the bar supply end 13, FIG. 22.

It is clear that modifications and/or additions of parts or steps may be made to the apparatus and method to feed bars as described heretofore, without departing from the field and scope of the present invention.

It is also clear that, although the present invention has been described with reference to some specific examples, a person of skill in the art shall certainly be able to achieve many other equivalent forms of an apparatus and a method to feed bars, having the characteristics as set forth in the claims and hence all coming within the field of protection defined thereby.

In the following claims, the sole purpose of the references in brackets is to facilitate reading and they must not be considered as restrictive factors with regard to the field of protection claimed in the specific claims.

The invention claimed is:

1. Apparatus to feed bars to one or more user machines located downstream, said apparatus comprising a support plane, a bar feed zone located in proximity to one bar supply end of said support plane, wherein said support plane is configured to move said bars in a direction of movement from and toward said bar feed zone, characterized in that it comprises:
 a support structure positioned in correspondence with said bar feed zone and configured to pass from a first position, in which it is above said support plane in order to support said bars and/or move said bars in a direction transverse to said direction of movement, to a second position, in which it is below said support plane in order to deposit said bars onto said support plane in correspondence with said bar feed zone,
 a plurality of containing and translation units disposed adjacent to each other with respect to said direction of movement and configured to contain and make available said bars on each occasion,
 said support plane being configured to move said bars from said bar feed zone toward said containing and translation units and vice versa, and from said bar feed zone to said bar supply end, and
 wherein each containing and translation unit comprises (i) at least two containers distanced and aligned in a longitudinal direction, transverse to said direction of movement, coordinated with each other and selectively movable in order to pass at least from a containing position, in which they are positioned below said support plane and are suitable to support a bundle of bars, to at least a release position, in which they are positioned above said support plane in order to release said bars onto said support plane, and (ii) at least two conveyors associated with said containers and aligned in said longitudinal direction, being coordinated with each other in order to pass at least from a lowered condition, in which they are substantially parallel to said support plane and allow the movement of said bars, to at least a raised condition in which they are raised in order to allow access to the respective containers.

2. Apparatus as in claim 1, wherein said bars are positioned on said support structure and wherein the apparatus includes at least one lifting unit associated with said support structure so as to allow the passage of said support structure from said first position to said second position and vice versa.

3. Apparatus as in claim 2, wherein said at least one lifting unit is provided with a pantograph mechanism that allows the passage from said first position to said second position and vice versa with a rotation movement defining a partial translation of said support structure in said direction of movement.

4. Apparatus as in claim 2, wherein said at least one lifting unit is provided with a vertical translation mechanism configured to move said support structure in a vertical direction incident and orthogonal to said support plane between said first position and said second position and vice versa.

5. Apparatus as in claim 2, wherein said support structure is defined by support elements disposed in succession in a direction orthogonal to the direction of movement and in an offset position with respect to said support plane.

6. Apparatus as in claim 5, wherein a respective lifting unit is associated with each of said support elements, said lifting units being synchronized with each other to allow the simultaneous passage of said support elements of said support structure from said first position to said second position and vice versa.

7. Apparatus as in claim 1, wherein said conveyors are separate from the respective containers, wherein said conveyors are mobile independently of said respective containers in order to independently pass respectively from said lowered condition to said raised condition, and from said containing position to said release position, possibly through respective intermediate conditions and positions.

8. Apparatus as in claim 7, wherein each containing and translation unit comprises a first transmission shaft and a second transmission shaft parallel to said longitudinal direction and facing each other, with which said conveyors and said containers are respectively associated.

9. Apparatus as in claim 8, wherein each conveyor has a first end pivoted to said first transmission shaft and with respect to which said conveyor is suitable to rotate in order to pass from said lowered condition to said raised condition and vice versa, and in that each respective container has a pivoting portion pivoted to said second transmission shaft and with respect to which it is configured to rotate, in the opposite direction to the direction of rotation of said conveyor, from said containing position to said release position and vice versa.

10. Apparatus as in claim 1, wherein with each containing and translation unit are associated at least one respective first actuation unit, configured to activate said conveyors in order to move said bars on said support plane, at least one respective second actuation unit, provided to allow the passage of said conveyors from said lowered condition to said raised condition and vice versa, and at least one third actuation unit provided to allow the passage of said containers from said containing position to said release position and vice versa.

11. Apparatus as in claim 9, wherein said at least one first actuation unit, second actuation unit and third actuation unit can be selectively activated/deactivated independently of each other.

12. Apparatus as in claim 1, wherein each conveyor, together with the respective container, constitutes a single movement body mobile in order to allow a first portion thereof, corresponding to the conveyor, to pass from said lowered condition to said raised condition, possibly through possible intermediate conditions, and a second portion thereof, corresponding to the container, to pass from said containing position to said release position, possibly through possible intermediate positions.

13. Apparatus as in claim 12, wherein each containing and translation unit comprises at least a first transmission shaft parallel to said longitudinal direction, and in that said movement body has, between said first portion corresponding to the conveyor and said second portion corresponding to the container, an intermediate pivoting portion with respect to which said movement body is rotatably associated.

14. Apparatus as in claim 12, wherein with each containing and translation unit are associated at least one respective first actuation unit, configured to activate said conveyors in order to move said bars on said support plane, and an actuation assembly, independent of said actuation unit, provided to move said movement body in rotation.

15. Apparatus as in claim 1, wherein at least said conveyors of all the containing and translation units, in a lowered condition, define said support plane.

16. Method to feed bars to one or more user machines, which provides to move said bars on a support plane in a direction of movement from and toward said bar feed zone characterized in that a support structure, which supports said bars in correspondence with, and/or moves said bars in a direction transverse to said direction of movement toward said bar feed zone, is moved from a first position, in which it is above said support plane in order to support said bars, to a second position, in which it is below said support plane in order to deposit said bars onto said support plane in correspondence with said bar feed zone, said bars, deposited on said support plane by said support structure, are moved from said bar feed zone toward containing and translation units and vice versa, and from said bar feed zone toward said bar supply end, said containing and translation units being disposed adjacent to each other with respect to said direction of movement and configured to contain and make available said bars on each occasion, and wherein each containing and translation unit comprises (i) at least two containers distanced and aligned in a longitudinal direction, transverse to said direction of movement, coordinated with each other and selectively movable in order to pass at least from a containing position, in which they are positioned below said support plane and are suitable to support a bundle of bars, to at least a release position, in which they are positioned above said support plane in order to release said bars onto said support plane, and (ii) at least two conveyors associated with said containers and aligned in said longitudinal direction, being coordinated with each other in order to pass at least from a lowered condition, in which they are substantially parallel to said support plane and allow the movement of said bars, to at least a raised condition in which they are raised in order to allow access to the respective containers.

\* \* \* \* \*